Sept. 2, 1958     L. G. PRICE     2,849,811
ELECTRIFIED GATE
Filed Oct. 5, 1955
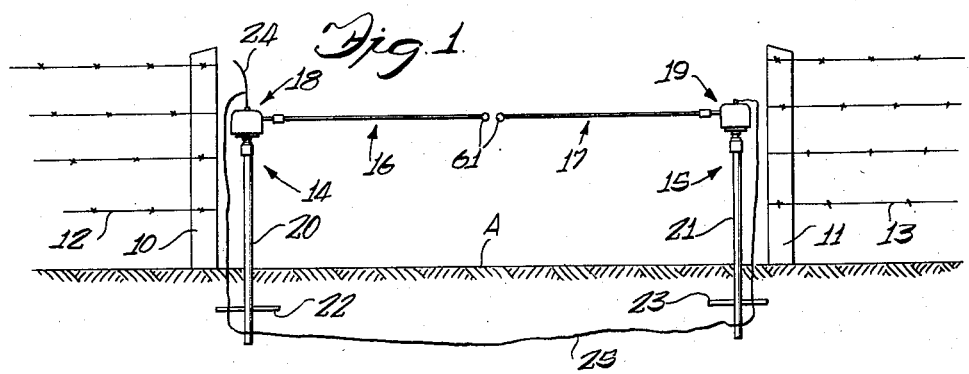
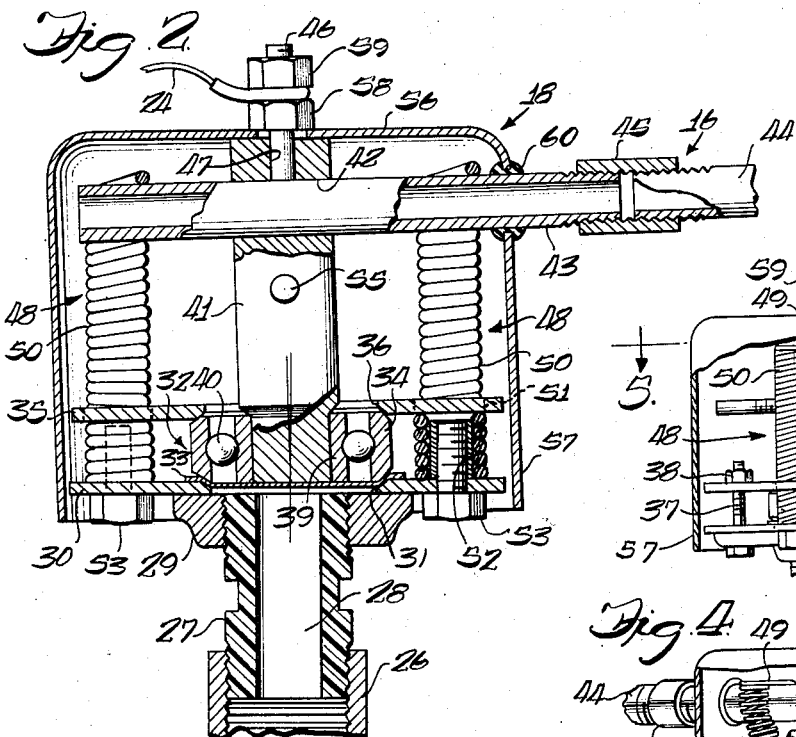
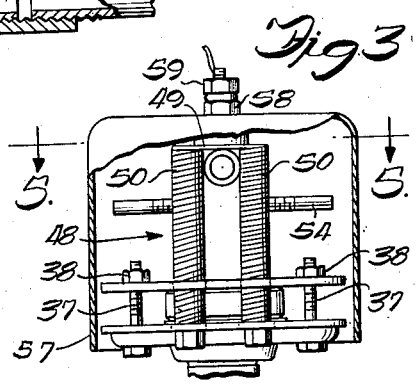
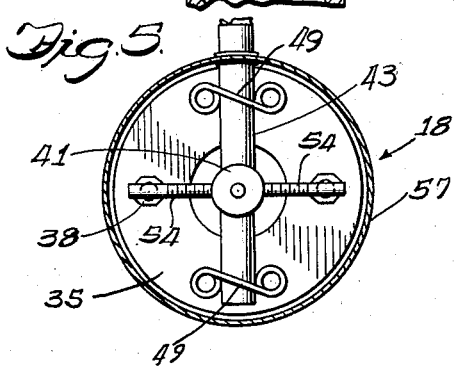
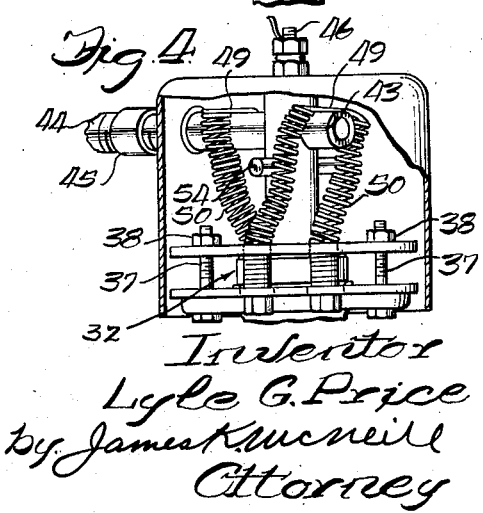
Inventor
Lyle G. Price
by James K. McNeill
Attorney

United States Patent Office 2,849,811
Patented Sept. 2, 1958

2,849,811

ELECTRIFIED GATE

Lyle G. Price, Dundee, Ill.

Application October 5, 1955, Serial No. 538,654

12 Claims. (Cl. 39—84)

This invention relates to gates, and particularly to a gate of the horizontally swinging type. More specifically, my invention concerns an electrified farm gate designed to discourage and repel livestock without impeding the passage of vehicles.

Although the present invention has a wide range of utility, it is particularly adapted for use as a farm gate. On farms it is customary to restrict cattle to certain fenced areas and to provide a gate through which the farmer may drive vehicles such as tractors with implements and trucks loaded with harvested corn, grain and the like. One of the major annoyances to which a farmer is subjected is the tendency of cattle to congregate around the farm gate through which these vehicles pass, and upon approaching the conventional farm gate, after a trip to the fields, the farmer finds that he must first drive the cattle away.

Electrifield farm gates which repel cattle are already known. It is already known to provide a resiliently mounted gate of the horizontal arm or bar type which opens by contact with an advancing vehicle and automatically returns to closed position. However, prior gates of this type have been inefficient and expensive to manufacture, and have been so constructed as to offer no protection to the mounting apparatus from the damaging effects of weather.

In view of the foregoing the present invention contemplates as its principal object the provision of an improved gate of simple and economical construction which swings open by contact with a driven vehicle, and which automatically returns to a normally closed position when the vehicle has passed through.

Another object of my invention is the provision of a novel mounting for a swinging gate, which is of sturdy, compact construction, neat in appearance, and has incorporated therewith a cover which protects the working parts against the weather.

A further object of my invention is the provision of a unitary electrified gate which is portable, easily installed to span a passageway and is readily connected to any available source of low voltage electric current of the type suitable for electric fencing.

Another object of my invention is the provision of an improved mounting for a swinging gate of the cantilever arm or bar type having a novel structure incorporating means compensating for the normal sag in the gate arm, whereby the arm is maintained substantially parallel to the ground.

Still another object of my invention is the provision of an improved resilient mounting for a swinging arm type of gate, wherein novel spring means incorporated in the mounting normally biases the gate arm to a neutral closed position, but is yieldable to accommodate opening the gate merely by the engagement of a traveling vehicle therewith.

Other objects and advantages of my invention will become clear from the following detailed description when read in conjunction with the accompanying drawings, wherein, Figure 1 is a schematic drawing showing the manner in which a double hung or twin gate made in accordance with the principles of my invention is mounted to span a passageway, Figure 2 is an enlarged section view of one of the mounting units, showing the manner in which the elongated gate element of each unit is resiliently anchored at one end for horizontal swinging in opposite directions from a normal closed or centered position across the passageway, Figure 3 is an elevation on a smaller scale than Figure 2, with part of the housing broken away, showing one of the spring units and the manner in which it straddles the inner end of the gate arm, Figure 4 is a view similar to Figure 3, showing the position of the parts when the gate has been opened, against the tension in the springs, and further illustrating the operation of the stop means by which the swinging of the gate is limited in both directions, and Figure 5 is a section taken on the line 5—5 of Figure 4.

Referring to the drawings, wherein like numerals designate like parts, it will be observed that Figure 1 illustrates one of the important uses of the apparatus of my invention, that of an electrified farm gate providing a barrier across a gap in a fence and designed to repel farm animals, particularly cattle, which tend to congregate at the gate and interfere with opening thereof and the passage of vehicles.

It has already been noted that the gate of this invention is the double hung or twin type consisting of a pair of self-contained units, each of which includes its own mounting post and does not require the presence of previously established fence posts. The drawings and description therefore illustrate and describe the double hung form of gate, although it should be clearly understood that the invention is equally applicable to a gate unit wherein a single electrified arm spans the entire passageway.

My improved gate may be incorporated in an existing fence, whether electrified or not, but may also be installed in other locations, such as between farm buildings or across a road, or the like. My invention is also easily adaptable to mounting upon existing fence posts.

In Figure 1 the numerals 10 and 11 designate the spaced posts of a conventional fence, which may or may not be electrified, defining a passageway therebetween and having the ends of fence wires 12 and 13, respectively, affixed thereto. As illustrated in the drawings, my improved gate is mounted in the passageway between fence posts 10 and 11 independently thereof, and comprises a pair of gate units 14 and 15. The units 14 and 15 comprise elongated electrically charged gate elements 16 and 17, respectively, each of which spans a portion of the passageway. These elements are supported at their inner ends and extend laterally from housings designated at 18 and 19, mounted upon the upper end of supporting posts 20 and 21. The posts are in the form of pipes driven into the ground below the surface "A" thereof, and have openings therein below the ground line to receive anchoring rods 22 and 23.

Electric current is supplied to charge the arms 16 and 17 from any suitable source, not shown, such as a conventional electric fence charger, through a wire 24 leading to housing 18 of gate unit 14. Electrified arm 17 at the other side of the passageway is supplied with an electric charge through a cable 25 connected to wire 24 at one end and extending across the passageway below the surface of the ground for connection to housing 19 of gate unit 15.

The mechanisms by which electrified gate elements 16 and 17 are mounted on their respective supports 20 and 21 are substantial duplicates, and a description of the left hand unit 14 will suffice for both. The upper end of pipe 20 is threaded to receive a coupling 26, the upper end of which receives the threaded lower end of an insulating block 27 of non-conductive material of any suitable composition, which is axially bored and strengthened by the provision of a metal insert 28 in the bore.

The upper end of block 27 is also threaded for reception in a threaded flange 29 affixed to a horizontal stationary circular base plate 30 having a central opening 31 with beveled edges serving as a seat for a ball bearing 32, but separated therefrom by a fiber washer 33. Bearing 32 includes a stationary annular outer race 34 pressed into its seat in the base plate by a second circular plate 35, vertically spaced above base plate 30, having a beveled central opening 36 serving as a seat for and resting upon bearing race 34. Bearing 32 is held firmly in its seat by bolts 37 slidably received in circumferentially spaced openings provided in plates 30 and 35 and adjustably held by nuts 38. By adjusting bolts and nuts 37 and 38, the axis of bearing 32 is canted and the bearing held in the position indicated in Figure 2, to compensate for the normal sag occurring due to the length of the gate arm.

Bearing 32 has a rotatable annular inner race 39 separated from outer race 34 by balls 40. Inner race 39 is free to rotate about its axis and has seated therein for rotation therewith the lower reduced end of a rotary member in the form of a shaft 41, tilted with bearing 32 slightly from the vertical.

Shaft 41 is provided near its upper end with a transverse opening 42 adapted to receive the inner end of the elongated electrified element or arm 16 for left-hand unit 14, similar provision being made for element 17 of right-hand unit 15.

Arm 16 is tubular and may be of any electrically conductive material, such aluminum, but is preferably made of small diameter galvanized steel pipe. The arm consists of an inner stub length of pipe 43 and an outer length 44 connected by a threaded coupling 45. The inner end of the arm is secured to rotary member 41 by a set screw 46 seated in a tapped opening 47 in the upper end of the shaft and communicating with transverse opening 42. Set screw 46 serves not only to frictionally hold element 16 to shaft 41, but also serves as a terminal for electric cable 25.

At this point it should be clear that gate arm 16 or 17 may be swung horizontally about the axis of shaft 41 from a normal closed position such as is indicated in Figure 1 to an open position such as is indicated by the position of the parts in Figure 4. Means now to be described are provided for normally holding the gate arms 16 and 17 in closed position, but yieldable to permit them to swing open upon engagement of a traveling vehicle therewith, while automatically returning the gate arm to closed position after the vehicle has passed through the passageway.

A pair of coil springs 48 are provided and each is bent into a U-shape to straddle the inner end of pipe stub 43, one on each side of shaft 41, and one or more central coils of the spring are elongated to form horizontal connectors 49 connecting the upper ends of a pair of spring sections 50, parallel to each other and to the axis of shaft 41.

The lower ends of spring sections 50 are slidably received in openings 51 provided in plate 35, and are anchored to base plate 30 by means which includes a threaded bushing 52 inserted in the lower coils of the spring and having an outer diameter somewhat larger than the inner diameter of the spring to effect expansion thereof to an outer diameter somewhat greater than that of openings 51 in plate 35. Bushing 52 is anchored to base plate 30 by a cap screw 53. The provision of cap screws 53 and the expansion of the lower ends of spring sections 50 assures safe anchorage therefor during flexing of the springs as a result of the swinging of arms 16 and 17 to open the gate.

The springs 48 on opposite sides of shaft 41 engage and confine the stub 43 at the inner end of the gate arm. When the gate is opened by engagement with a vehicle springs 48 are deflected angularly by swinging of the associated arm 16 or 17, and the parts assume the position indicated in Figure 4.

The swinging of the gate arm is limited by novel stop means in the form of a pair of rods 54 secured to and projecting radially from opposite sides of shaft 41. The shaft is preferably provided with threaded openings 55 on opposite sides thereof to receive the threaded ends of rods 54 at opposite sides of the shaft.

The action of stop rods 54 is clearly seen in Figure 4. As the gate arm is swung horizontaly to open the gate, shaft 41 and rods 54 rotate with it and springs 48 are deflected. Since the bases of the springs held between plates 30 and 35 remain stationary, only the upper parts of the springs above plate 35 are deflected. Shaft 41 therefore can be rotated until rods 54 engage the deflected portions of the springs to limit the rotation of the shaft.

When the gate arm is released the springs 48 promptly right themselves after deflection and bias the return of the gate to a neutral closed position.

The gate mounting apparatus just described is highly efficient, yet of simple and economical construction, and the operation of the gate should be clearly understood. However, a farm gate is exposed to the weather, and the compact arrangement of the parts of my novel gate mounting makes possible the protection thereof from elements which would normally cause corrosion and eventually destroy the usefulness of the gate. To this end I have made my gate mounting substantially cylindrical in the arrangement of parts and I have provided the generally cylindrical housing or covers 18 and 19 of non-rusting metal, in the form of an inverted cup having a top portion 56 and side walls 57 surrounding the mounting apparatus and extending to a point somewhat below base plate 30.

The cover is held rigidly in place by the provision of a central aperture in top 56 to receive the upwardly projecting end of set screw 46, and is held in place against the top of shaft 41 to rotate therewith by a lock nut 58. Another nut 59 secures the terminal of electric cable 25 against nut 58, the electric charge being thus conducted from cable 24 to set screw 46 of left-hand gate unit 14 and thence to gate arm 16. As shown diagrammatically in Figure 1, current is led from cable 24 through wire 25 to the right-hand gate unit 15, whence it is directed to gate arm 17.

Each of the gate arms passes through an opening in the associated housing, and the opening is provided with a rubber grommet 60. In addition, any likelihood of injury to a vehicle such as a tractor or automobile passing through the gate is minimized by the provision of rubber caps 61 at the ends of arms 16 and 17.

It should be understood that my invention has been described in its preferred embodiment only, and that modifications may be made therein without departing from the spirit of the invention or the scope of the appended claims.

I claim:

1. In a gate including an elongated element supported at one end arranged to extend across a passageway, supporting means for said one end of the elongated gate element accommodating swinging thereof from a normal closed position to an open position and its automatic return, comprising a relatively stationary member, an upright member rotatably mounted on said stationary member, means securing one end of said elongated element to said upright member, and means yieldably resisting the rotation of said upright member comprising a pair of spring sections generally parallel to said upright member and receiving said elongated element therebetween, means anchoring one end of each of said spring sections to said stationary member and means connecting the free ends of said spring sections whereby, upon swinging of said elongated element and rotation of said upright member the free ends of said spring sections are deflected in the direction of rotation of said upright member.

2. In a gate including an upright post and an elongated arm extending laterally therefrom across a passageway, supporting means for said arm accommodating horizontal swinging thereof between open and closed positions, comprising a stationary member, an upright member mounted on said stationary member for rotation relative thereto about an axis canted at an angle to the vertical, and means securing one end of said elongated arm to said rotatable member to extend therefrom at right angles to said axis, the axis of rotation of said upright member being canted from the vertical in a direction to cause said arm to assume an angle toward its free end canted upwardly from the horizontal.

3. In a gate including an upright post and an elongated arm extending laterally therefrom across a passageway, supporting means for said arm accommodating horizontal swinging thereof between open and closed positions, comprising a stationary member, a rotatable member mounted on said stationary member for rotation on an axis canted from the vertical, and means mounting said arm on said rotatable member for swinging therewith, whereby said arm is canted at an angle upwardly from the horizontal toward the end remote from said rotatable member.

4. In a gate including an upright post and an elongated arm extending laterally therefrom across a passageway, supporting means for said arm accommodating horizontal swinging thereof between open and closed positions, comprising a stationary member, a rotatable member mounted on said stationary member for rotation on an axis canted from the vertical, and means mounting said arm on said rotatable member for swinging therewith, whereby said arm is canted at an angle upwardly from the horizontal toward the end thereof remote from said mounting means, means operatively connected between said upright member and said arm to bias the latter to return to its closed position from its open position, and stop means for limiting the horizontal swinging of said arm.

5. In a gate including an upright post and an elongated gate arm extending laterally therefrom across a passageway, supporting means for the inner end of said arm accommodating horizontal swinging of said arm between open and closed positions of the gate, comprising a stationary member supported by said post, a bearing mounted on said member having a fixed part and a rotatable part, a generally vertical member carried by said rotatable part for rotation therewith, means securing said arm to said vertical member to extend at right angles thereto, and means securing said bearing to said stationary member with the axis of the bearing disposed at an angle to the vertical, whereby said arm is tilted upwardly toward its outer end to compensate for sag therein.

6. The invention set forth in claim 5, wherein the means securing the bearing to the stationary member is adjustable to vary the angle of the bearing axis with respect to the vertical.

7. In a gate including an upright post and an elongated gate arm extending laterally therefrom across a passageway, supporting means for the inner end of said arm accommodating horizontal swinging of said arm between open and closed positions of the gate, comprising a stationary member supported by said post, a bearing mounted on said member having a fixed part and a rotatable part, a generally vertical member carried by said rotatable part for rotation therewith, means securing said arm to said vertical member to extend at right angles thereto, means securing said bearing to said stationary member with the axis of the bearing disposed at an angle to the vertical, whereby said arm is tilted upwardly toward its outer end to compensate for sag therein, and means yieldably resisting swinging of said arm to open position, comprising a pair of spaced coil springs anchored to said stationary member and extending upwardly therefrom on opposite sides of said arm, said springs being operatively engageable with and angularly deflectable by said arm upon swinging thereof.

8. The invention set forth in claim 7, wherein said springs constitute two parallel sections of a single continuous coil spring having its ends anchored to said stationary member, and having one or more of its central coils elongated.

9. In a gate including an upright post and an elongated gate arm extending laterally therefrom across a passageway, supporting means for the inner end of said arm accommodating horizontal swinging of said arm between open and closed positions of the gate, comprising a stationary member supported by said post, a bearing mounted on said member having a fixed part and a rotatable part, a generally vertical member carried by said rotatable part for rotation therewith, means securing said arm to said vertical member to extend at right angles thereto, means securing said bearing to said stationary member with the axis of the bearing disposed at an angle to the vertical, whereby said arm is tilted upwardly toward its outer end to compensate for sag therein, means yieldably resisting swinging of said arm to open position, comprising a pair of spaced coil springs anchored to said stationary member and extending upwardly therefrom on opposite sides of said arm, said springs being operatively engageable with and angularly deflectable by said arm upon swinging thereof, means connecting the upper coil ends of said springs over said arm, and stop means affixed to and projecting radially from said vertical member, said stop means being engageable by said springs during rotation of said vertical member and after a predetermined deflection of said springs to limit the swinging of said arm.

10. In a gate including an upright post and an elongated gate arm extending laterally outwardly therefrom across a passageway, supporting means for the inner end of said elongated arm accommodating horizontal swinging of said arm between open and closed positions of the gate, comprising a stationary member supported by said post, a bearing mounted on said member having a fixed part and a rotatable part, a generally vertical member carried by said rotatable part for rotation therewith, means securing said arm to said vertical member to extend laterally therefrom, a pair of spaced coil spring sections anchored to said stationary member and extending upwardly therefrom on opposite sides of said arm, said sections being formed from a single coil spring having one or more of its central coils elongated and extending over said arm to confine the latter between said sections, said spring sections being angularly deflectable against the tension therein upon swinging the arm to open position.

11. In a gate including an upright post and an elongated gate arm extending laterally outwardly therefrom across a passageway, supporting means for the inner end of said elongated arm accommodating horizontal swinging of said arm between open and closed positions of the gate, comprising a stationary member supported by said post, a bearing mounted on said member having a fixed part and a rotatable part, a generally vertical member carried by said rotatable part for rotation therewith, means securing said arm to said vertical member to extend laterally therefrom, a pair of spaced coil spring sections anchored to said stationary member and extending upwardly therefrom on opposite sides of said arm, said sections being formed from a single coil spring having one or more of its central coils elongated and extending over said arm to confine the latter between said sections, said spring sections being angularly deflectable against the tension therein upon swinging the arm to open position, and stop means projecting radially from said vertical member and engageable with said spring sections to limit the swinging of said arm.

12. In a gate including an upright post and an elongated gate arm extending laterally outwardly therefrom across at least part of a passageway, supporting means for the inner end of said gate arm accommodating horizontal swinging of said arm to open position of the gate and the automatic return thereof to a normal closed position, including a horizontal base member secured to the post, a plate member vertically spaced from said base member and secured thereto, bearing means confined between said base and said plate, a generally vertical shaft rotatably carried by the bearing, means securing the inner end of the gate arm to said shaft for rotation therewith, resilient means connected between said base member and said arm operable to bias the latter to return to its closed position, said resilient means comprising a coil spring having a U-shape to straddle and confine said arm, said plate member having apertures therein to receive the ends of said spring, and means anchoring the ends of said spring to said base member.

References Cited in the file of this patent

UNITED STATES PATENTS

| | | |
|---|---|---|
| 270,368 | Barlow | Jan. 9, 1883 |
| 962,330 | Fischer | June 21, 1910 |
| 1,583,842 | Keene | May 11, 1926 |
| 2,200,570 | Zint | May 14, 1940 |
| 2,540,562 | Wood | Feb. 6, 1951 |
| 2,616,195 | Stafford | Nov. 4, 1952 |
| 2,731,744 | Schnell | Jan. 24, 1956 |
| 2,796,485 | Durkee | June 18, 1957 |

FOREIGN PATENTS

| | | |
|---|---|---|
| 463,419 | Italy | Mar. 4, 1951 |